(12) United States Patent
Stolz et al.

(10) Patent No.: US 11,365,799 B2
(45) Date of Patent: Jun. 21, 2022

(54) DRIVE DEVICE WITH SPEED LIMITATION

(71) Applicant: VOITH PATENT GMBH, Heidenheim (DE)

(72) Inventors: Tobias Stolz, Satteldorf (DE); Peter Vogel, Crailsheim (DE); Tobias Seeberger, Dinkelsbuehl (DE)

(73) Assignee: Voith Patent GmbH, Heidenheim (DE)

( * ) Notice: Subject to any disclaimer, the term of this patent is extended or adjusted under 35 U.S.C. 154(b) by 66 days.

(21) Appl. No.: 16/968,655

(22) PCT Filed: Feb. 5, 2019

(86) PCT No.: PCT/EP2019/052707
§ 371 (c)(1),
(2) Date: Aug. 10, 2020

(87) PCT Pub. No.: WO2019/154777
PCT Pub. Date: Aug. 15, 2019

(65) Prior Publication Data
US 2021/0364081 A1 Nov. 25, 2021

(30) Foreign Application Priority Data
Feb. 9, 2018 (DE) .................... 20 2018 100 711.4

(51) Int. Cl.
*F16H 57/04* (2010.01)
*F16H 57/10* (2006.01)

(52) U.S. Cl.
CPC ..... *F16H 57/0435* (2013.01); *F16H 57/0486* (2013.01); *F16H 57/10* (2013.01)

(58) Field of Classification Search
CPC .. F16D 57/00; F16D 57/0435; F16D 57/0486; F16D 57/10
See application file for complete search history.

(56) References Cited

U.S. PATENT DOCUMENTS 3,503,281 A * 3/1970 Gsching ................. F16D 67/00
475/32
4,768,401 A 9/1988 Fuehrer et al.
(Continued)

FOREIGN PATENT DOCUMENTS

CN 203439004 U * 2/2014
DE 3430456 A1 10/1985
(Continued)

*Primary Examiner* — Stacey A Fluhart
(74) *Attorney, Agent, or Firm* — Laurence A. Greenberg; Werner H. Stemer; Ralph E. Locher

(57) ABSTRACT

A drive device has a superimposed transmission, an input shaft connected a main drive machine, one or more auxiliary drives, a hydrodynamic retarder for braking the auxiliary drive, and an output shaft to be connected to a working machine. The superimposed transmission has a planetary transmission, with the input shaft connected to a ring gear and the output shaft connected to a sun gear. The retarder is incorporated into a lubricating oil system of the drive device in parallel. A feed line branches from the lubricating oil system and leads to the retarder. A return line leads from the retarder and opens into the lubricating oil system. A valve enables the feed line to be released in the event of a rapid disconnection or energy supply failure of one of the drives, and thus the retarder can be filled with oil.

14 Claims, 2 Drawing Sheets

(56) References Cited

U.S. PATENT DOCUMENTS

| | | | | |
|---|---|---|---|---|
| 6,817,455 | B1 * | 11/2004 | Gazyakan | ............... B60T 1/087 |
| | | | | 188/290 |
| 8,287,413 | B2 * | 10/2012 | Besnard | ................ B60K 6/448 |
| | | | | 475/5 |
| 10,458,524 | B2 | 10/2019 | Hehenberger | |
| 10,661,649 | B2 * | 5/2020 | Waldner | ................ F03D 15/00 |
| 2021/0172510 | A1 * | 6/2021 | Hedman | ............. F16H 61/0059 |

FOREIGN PATENT DOCUMENTS

| | | |
|---|---|---|
| DE | 19951735 A1 | 5/2001 |
| DE | 102014210868 A1 | 12/2015 |
| DE | 102015218345 A1 | 3/2017 |
| WO | 2016100991 A1 | 6/2016 |

* cited by examiner

DRIVE DEVICE WITH SPEED LIMITATION

BACKGROUND OF THE INVENTION

Field of the Invention

The invention relates to a drive device comprising a superposition transmission, a main drive machine which is connected to an input shaft of the superposition transmission, one or more auxiliary drives, a hydrodynamic retarder for braking the auxiliary drive and an output shaft of the superposition transmission, which output shaft can be connected to a work machine; wherein the superposition transmission has a planetary transmission with a ring gear, a sun gear, a planet carrier and a plurality of planet gears, wherein the input shaft is connected to the ring gear, the output shaft is connected to the sun gear, and the one or more auxiliary drives are connected by means of at least one transmission stage with a constant transmission ratio to the planet carrier, and wherein the retarder is connected to an auxiliary drive.

In the case of a superposition transmission, in general, two shafts of the planetary transmission are driven by mutually independent drives such that the rotational speeds are added or subtracted at the third shaft, the output shaft. If one of the drives is controllable, it is then thus possible to realize a continuously variable speed control for the output shaft.

From the prior art, drive devices having a superposition transmission are known in which a main drive machine drives the ring gear of a planetary transmission via the input shaft, and a controllable auxiliary drive drives the planet carrier via a transmission stage, whereas the drive machine is connected via the output shaft to the sun gear. By means of such a drive device, the rotation speed at the output shaft can be adjusted in a continuously variable fashion over an extremely large rotational speed range, this being possible with a main drive machine which is running constantly.

It is furthermore possible for the main drive to be crank-started without load by virtue of the auxiliary drive imparting in each case the rotation speed of the main drive machine during the run-up. Only when the main drive is in the vicinity of the setpoint rotational speed, and can thus impart a high torque, is the load slowly accelerated by virtue of the compensation of the rotation speed by means of the auxiliary drive being reduced.

Such drive devices are used in particular for driving pumps, compressors or supercharging blowers with high power, such as are used for example in the oil and gas industry or in thermal power plants.

Such a drive device, additionally equipped with a braking device which is connected to an auxiliary drive, is disclosed in DE 102014210868 A1. A hydrodynamic retarder is also mentioned in general as a possible embodiment for the braking device. The braking device therein is provided exclusively for braking or shutting down the output shaft. A retarder comprises two blade wheels, of which one is connected to the housing for rotation while the second blade wheel is connected to a rotating shaft. If the working space formed by the blade wheels is now filled with oil, a revolving flow arises therein, generating a braking torque on the rotating blade wheel.

However, the problem that the auxiliary drive and the transmission may be damaged if the auxiliary drive machine fails during operation or has to be isolated from the network is not satisfactorily solved. Such a failure may occur if what is referred to as a blackout—a complete network failure—occurs or if errors to one of the drives or to one of the switching installations cause a shutdown. Since, in the usage situations mentioned above, the inertia of the main drive machine is normally much greater than that of the driven work machine, the rotational speed of the work machine will quickly decrease to zero even in the event of a failure or shutdown of the drive torque at the main drive machine. In the case of this transmission variant, owing to the rotational speed equilibrium at the planetary transmission, the planet carrier and the auxiliary drive will be greatly accelerated. Impermissible rotational speeds may occur here at the planet carrier and at further system components. It is even more critical if the main drive continues to operate while the auxiliary drive fails. The auxiliary drive is then even more rapidly accelerated. The brake device, which is described in the prior art, at the auxiliary drive is not suitable for reliably preventing this critical acceleration of the auxiliary drive and of the planet carrier in the event of failure of the energy supply.

SUMMARY OF THE INVENTION

It is now the object of the invention to find an improved solution for the abovementioned problem. The intention is for the solution to be able to be realized cost-effectively.

For the device, the object is achieved by means of a drive device as claimed. Further advantageous features of the embodiment according to the invention that further improve the device are found in the corresponding dependent claims. The device is characterized in that the retarder is incorporated parallel to a lubricating oil system, which is provided for the drive device, wherein the device comprises a feed line, which branches off from a lubricating oil system and leads to the retarder, and comprises a return line, which leads from the retarder to the lubricating oil system and opens into the latter, wherein a valve is provided in the feed line in such a manner that it can release the feed line in the event of a fast shutdown or failure of the energy supply of one of the drives and the retarder can therefore be filled with oil without an external energy supply being required.

Parallel to the lubricating oil system should be understood here as meaning that a partial flow of oil is branched off from the lubricating oil system, conducted through the oil supply of the retarder and returned into the lubricating oil system. The lubricating oil system comprises at least one lubricating oil pump and a line segment from which the feed line branches off and into which the return line opens.

The lubricating oil system optionally comprises one or more further components, such as, for example, an oil filter, a heat exchanger for cooling purposes, and a throttle.

The advantage of such a solution according to the invention is that, even in the above-described fault situation, an excessive rotational speed at the planet carrier, the weakest element in the drive device, can thereby be reliably avoided. Thus, in particular, the planet journals are protected against damage due to excessively high centrifugal forces. At the same time, it is a cost-effective solution which returns the used oil back to the lubricating oil circuit.

A further advantage is that, owing to the hydrodynamic manner of operation, the retarder can have a parabolic braking behavior, that is to say that the brake torque is high in the event of a high differential speed and then decreases the more the auxiliary drive is braked. As a result, the auxiliary drive is not unnecessarily sharply braked, but only until there is no longer any risk of the excessive rotational speed. In addition, the brake is free from wear is therefore very easy to maintain. An additional advantage is that the retarder can be readily used in a region at risk of explosion.

In contrast to friction brakes, the retarder dissipates the thermal energy arising during the braking operation in a reliable and controlled manner via the oil. Explosion protection specifications are provided especially in the oil and gas market sector. This system can be reliably braked with the developed solution even if the winding temperature of the drive has exceeded the permissible temperature threshold value and braking via the frequency transformer is no longer possible.

The arrangement is well-suited to high rotational speeds at the output, such as are required, for example, in the case of fast-running supercharging blowers or in the case of large fans, because in this way the structural space and the weight of the drive device can be kept relatively small or low. The inventive embodiment is particularly advantageous if the main drive machine is operable only at a constant rotational speed, and the one or more auxiliary drives are operable with rotational speed control, and, in particular, the one or more auxiliary drives are designed as low-voltage motors. A major part of the drive power can be imparted by the main drive machine operated constantly. Said main drive machine does not require any frequency transformer, which saves investment costs. The main drive machine is preferably designed as a medium-voltage motor, that is to say with a voltage of greater than 1 kV. The rotational speed control is realized by means of the auxiliary drives, which require less power and which are preferably designed as low-voltage motors with a voltage of less than 1 kV. The frequency transformers required for these are thus relatively small and relatively inexpensive.

A transmission stage is understood as meaning a drive connection which transmits power and torque with a constant transmission ratio, that is to say a fixed rotational speed ratio.

In addition, the return flow of oil can be controlled by means of an, in particular adjustable, throttle in the return line between retarder and lubricating oil system. The time profile of the braking behavior can therefore be influenced. By means of the flow through the retarder, the necessary dissipation of heat from the retarder in the event of a fault, that is during operation of the retarder, can be ensured. Furthermore, it is advantageous to provide a nonreturn valve in the return line, and therefore the flow direction in the lines is always set in the desired manner.

A further advantage of the embodiment according to the invention is that even a possibly occurring reverse running can be braked over a prolonged period. Reverse running may occur, for example, in the case of pumps or supercharging blowers if the latter are shut down or slowed down. It is necessary here to brake the reverse running while the main drive machine is stationary since even here an impermissible excessive rotational speed may otherwise occur at certain components. This is achieved particularly readily in an embodiment with an electrically driven lubricating oil pump.

The return line from the retarder is preferably arranged in such a manner that it opens into the line of the lubricating oil system upstream of a heat exchanger provided in the lubricating oil system. This is particularly advantageous if, for example, in addition to the activation of the retarder in the event of one of the abovementioned fault situations, use of the retarder as a wear-free brake during normal operation of the drive device is also provided.

It is of advantage if the valve for filling the retarder has two switching positions, a first, in which the feed line to the retarder is blocked, and a second switching position, in which the feed line to the retarder is released, wherein the valve is designed in such a manner that it is in the first switching position during normal operation and passes into the second switching position in the event of failure or interruption of the energy supply of the valve. That is to say that the valve is closed during normal operation and, in the event of a fault, passes into the open position such that the retarder by filling with oil is activated. For example, it can be achieved by means of a restoring spring at the valve. In particular, the valve is designed as a 2/2 way valve.

It is furthermore advantageous if at least one adjustable throttle and/or at least one nonreturn valve are/is provided in the return line. The oil throughput rate in the retarder and therefore the development of the temperature in the retarder can thereby be influenced in a targeted manner. The nonreturn valve prevents undesirable backflows. In addition the braking characteristics can also be influenced.

In order to avoid overheating of the superposition transmission, it is of advantage if the retarder is arranged outside the transmission housing of the superposition transmission.

The retarder is preferably connected to the auxiliary drive in such a manner that it has the same rotational speed as the auxiliary drive; in particular, said retarder is connected directly to the auxiliary drive shaft, i.e. without a transmission stage in between. A good braking action is thereby achieved by the retarder, and this is advantageous in terms of structural space.

In a further advantageous embodiment, an intermediate line is provided in the oil supply for the retarder, which intermediate line connects the feed line upstream of the valve to the return line in such a manner that, during the operation of the drive device, some oil can flow permanently through the intermediate line even if the retarder is not activated. Said intermediate line which forms a short circuit between feed and return is expedient especially in the event of long line routes between lubricating oil system and retarder, in order to keep the oil supply of the retarder free from air even in the event of prolonged inactivity and to provide a certain amount of frost protection. In addition, a throttle can be provided in the intermediate line in order to limit the throughflow.

In a further device according to the invention, in order to empty the retarder, a drain line is provided via which oil can be discharged from the retarder into an oil sump.

Particularly preferably, in addition to the feed line, a separate lubricating oil line to the retarder is provided, which is designed in such a manner that some oil permanently flows out of the lubricating oil system through the retarder during the operation of the drive device. Even said additionally branching-off lubricating oil line can have a throttle. With the depicted line routing, the lubrication of the retarder is ensured independently of the operation of the retarder. In addition or alternatively, if no lubrication is necessary, for example because of an external mounting, the lubricating oil line can serve to always guide some oil through the retarder during normal operation, i.e. without braking. Heat which arises due to idling losses is thus reliably dissipated. The idling loss is reduced by said small quantity of oil.

In an advantageous manner, a throttle is provided in the line segment of the lubricating oil system between the branching off of the feed line from the lubricating oil system and the opening of the return line into the lubricating oil system. The distribution of the throughflow quantities to the line segment in the lubricating oil system and to the oil supply of the retarder can thus be adjusted. The throttle is important in particular during the activation of the retarder. The pressure gradient between feed and return is increased by means of the throttle, and therefore the retarder is filled with oil until it acts in a self-priming manner.

Particularly preferably, a lubricating oil pump is provided in the lubricating oil system of the drive device, which lubricating oil pump is mechanically coupled to one of the shafts of the drive device, in particular to one of the shafts of the planetary transmission, in such a manner that, even in the event of failure or interruption of the energy supply for the drive device, said lubricating oil pump continues to be driven as long as the shaft rotates, and can thereby fill the oil supply of the retarder.

Alternatively to the mechanical connection to one of the shafts, the lubricating oil pump can also be connected to a motor with an interruption-free power supply. The reliable supplying of the retarder with oil in the event of a malfunction is thus also ensured.

The retarder is preferably connected to the auxiliary drive in such a manner that it has the same rotational speed as the auxiliary drive. For example, it can be connected directly to an auxiliary drive shaft. The auxiliary drive has generally a higher rotational speed than the planet carrier and the retarder has a better braking action at a high rotational speed. Sharper braking is thereby possible, or a smaller retarder can be used if the retarder is installed at a location of lower rotational speed.

A further increase in the operating reliability is possible if the drive device is designed in such a manner that, of the three rotational speeds: that of the main drive machine, that of the output shaft and that of the auxiliary drive, at least two rotational speeds can be detected or measured, in particular with the aid of pulse generators at the drive and/or rotational speed sensors. As a result, the third of the rotational speeds can also be determined even if it is not measured. Errors can therefore be detected at an early point and faults can be reacted to rapidly or even predictively.

It is described below how, in the event of a fault, an undesirable excessive rotational speed of the auxiliary drive, at the planet carrier or at further system components can be avoided with a drive device according to the invention.

First of all, a failure or a fast shutdown of the main drive machine or of an auxiliary drive has to be detected, in particular with reference to a malfunction signal. The detection of a failure or of a fast shutdown, wherein this also encompasses an impending failure or an impending fast shutdown, may be performed for example by means of the drive controller and/or by means of signals from the power supply, in particular in the event of failure of the supply network or triggering of safety devices or emergency-off devices. Error or fault messages may likewise be used.

In order to detect a failure or an impermissibly high rotational speed, measurement of the rotational speed at the planet carrier or at one or more auxiliary drives is preferably provided. The measurement can be undertaken by means of rotational speed sensors at a suitable location or by means of pulse generators at the drives. The braking operation is triggered if a certain rotational speed limit is reached or exceeded. Said rotational speed limit is predetermined by the maximum permissible mechanical limit rotational speed.

In particular, it is of advantage if an impending failure of the auxiliary drives can be identified even before the onset thereof. For this purpose, it is for example possible for upper temperature limits for the winding temperature and/or for the bearing temperature of one or more drives to be monitored by means of one or more temperature sensors.

Furthermore, it is possible for current acceleration values from the measured or determined rotational speeds to be additionally used for the detection of a failure or impending failure. It is thus possible, in the event of particular gradients occurring in the rotational speed, for a failure to be detected.

If a corresponding fault is identified, the retarder is filled with oil by switching over the designated valve which releases the connection to the retarder. The switching over can be undertaken, for example, by means of a relay circuit or a memory-programmable controller. If the supply of energy is interrupted, the relay drops automatically into the desired switching position.

The at least partially filled retarder leads to braking of the auxiliary drive and of the planet carrier which is connected thereto via at least one transmission stage. The filling quantity is controlled according to the desired braking characteristics, for example by means of the adjustable throttle in the return.

The braking of the drive device does not necessarily have to take place until standstill. Within certain limits, an emergency operation at a reduced rotational speed may also be made possible with the retarder. For example, in the event of failure of the auxiliary drives, the retarder can impart the necessary supporting torque in order to brake the main drive machine, which is still in operation, in such a manner that a lower load point can be maintained with the drive device.

On the basis of exemplary embodiments, further advantageous configurations of the invention will be discussed with reference to the drawings. The stated features may not only be advantageously implemented in the illustrated combination but also individually combined with one another. In detail, in the figures:

DETAILED DESCRIPTION OF THE INVENTION

The figures will be described in more detail below. The same reference designations are used to denote identical or analogous parts or components.

Figure 1:
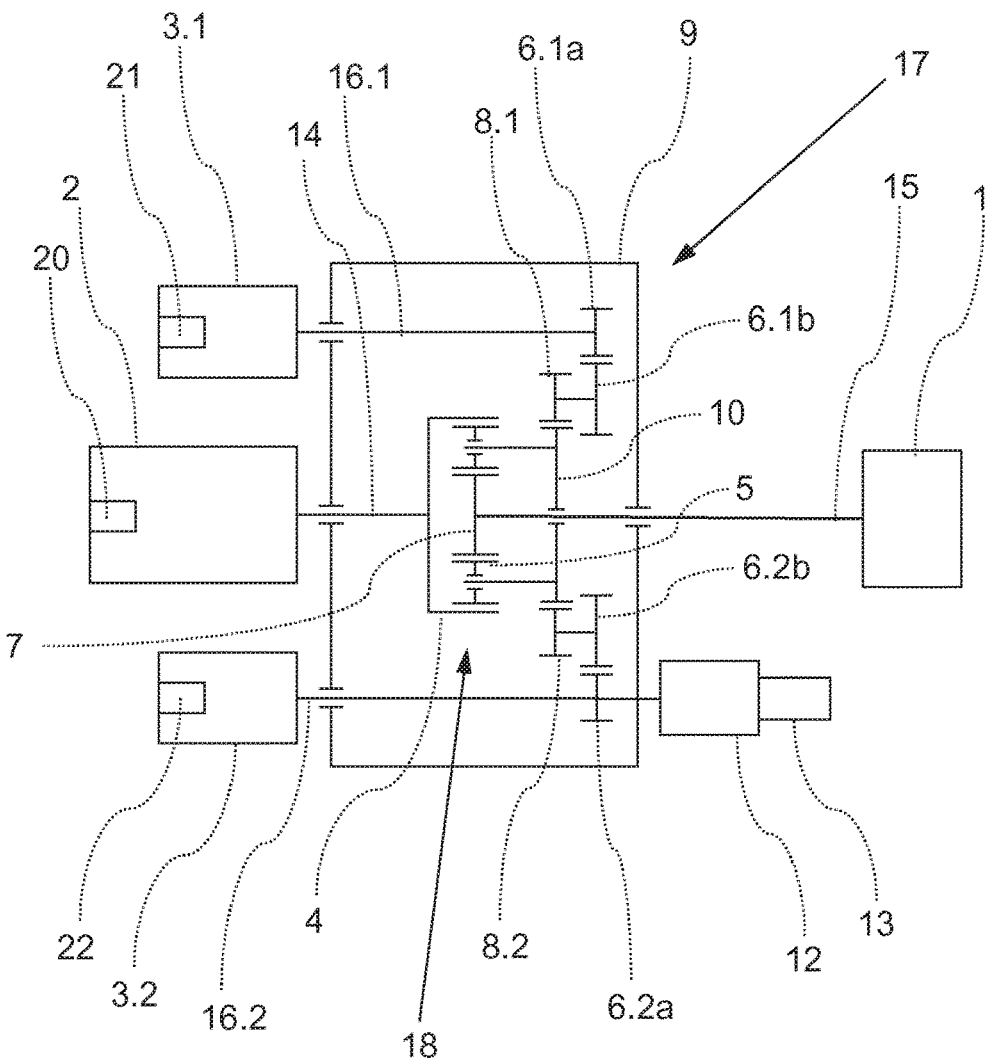
FIG. 1 shows a drive device according to the invention

FIG. 1 shows a drive device according to the invention which is connected by means of the output shaft 15 to the work machine 1. The method according to the invention for rotational speed limitation can be advantageously used on a device of said type. The superposition transmission 17 has a housing 9 and comprises a planetary transmission 18. The input shaft 14 connects the main drive machine 2 to the ring gear 4 of the planetary transmission, and the output shaft 15 connects the sun gear 7 to the work machine 1. The third shaft of the superposition transmission is formed by the auxiliary drive shafts 16.1 and 16.2. These connect the auxiliary drives 3.1 and 3.2 via the transmission stages 6.1*a/b* and 6.2*a/b* to the planet carrier 10. The planet carrier 10 firstly bears the planet gears 5 by means of the planet journals and secondly is designed as a toothed gear with an outer toothing, said toothed gear meshing with the respective toothed gears 8.1, 8.2 and thus forming a further transmission stage. The toothed gears 8.1 and 6.1*b* and 8.2 and 6.2*b* are preferably designed as what is referred to as a stepped gear. The toothed gear on the planet carrier 10 may also be joined, and need not imperatively be formed in one piece from the planet carrier. This figure illustrates the preferred variant for the transmission stage, specifically in the form of a spur gear stage. Furthermore, this embodiment is equipped with two auxiliary drives 3.1 and 3.2; the invention may, however, also be implemented with only one auxiliary drive or with a plurality of, for example three, auxiliary drives. It is important that the auxiliary drives are coupled by means of at least one transmission stage 6.1*a/b*, 6.2*a/b*, 8.1, 8.2 with a constant transmission ratio to the planet carrier 10.

The auxiliary drives 3.1, 3.2 are designed as controllable motors with a relatively low power, and the main drive machine 2 is designed as a motor with a relatively high power but constant rotational speed. The auxiliary drives may preferably be designed as low-voltage motors, because they often exhibit only approximately 10 to 30% of the overall drive power. Thus, the required frequency transformers and the other components for control purposes are also relatively small and more favorable. The main drive machine 2 is, in many applications, designed as a medium-voltage motor in order to provide the required power overall, and may be implemented without control means. Such drive devices are of particular interest in the case of high levels of power of several MW, such as are encountered in the case of high-speed pumps, supercharging compressors or fans in the oil and gas industry or in thermal power plants. By means of the rotational speed and direction of rotation of the auxiliary drives 3.1, 3.2, the rotational speed at the output shaft 15 can be increased or decreased by a certain amount. The limits of this range in the case of a maximum rotational speed of the auxiliary drives 3.1, 3.2, on the one hand in a positive direction of rotation and on the other hand in a negative direction of rotation, predefine the possible control range.

If one of the drives 2, 3.1, 3.2 now fails due to a fault, or if a fast shutdown, in particular of the main drive 2, is initiated, the rotational speed at the work machine falls rapidly, because its inertia in these usage situations is very much smaller than that of the drive motors 2, 3.1, 3.2. Since the inertia of the auxiliary drives 3.1, 3.2 is also still smaller than that of the main drive machine 2, the planet carrier 10 and the auxiliary drives 3.1, 3.2 are accelerated in the event of a fault, owing to the rapid run-down of the work machine 1 and the slow run-down of the main drive machine 2. If an impermissibly high rotation speed is reached here, the auxiliary drives 3.1, 3.2 and in particular the planet gears 5 and the journals thereof may be damaged. A reliable design of the planetary transmission 18 with regard to this particular fault situation would make the drive device unduly large and expensive.

The problem can be solved by provision of a retarder 12 with a connection according to the invention to a lubricating oil system of the drive device. The oil supply 13 of the retarder is designed in such a manner that the retarder 12 can be filled with oil even in the event of a fault, and therefore the auxiliary drives 3.1, 3.2 and the planet carrier 10 can be reliably braked in the event of a fault. An impermissible excessive rotational speed is reliably prevented.

The braking does not necessarily have to take place here to a standstill. In some situations, an emergency operation with a reduced rotational speed can be maintained, for example if the auxiliary drives 3.1, 3.2 fail and the main drive machine 2 continues to operate. The retarder 12 here imparts the necessary supporting torque in order to brake the main drive machine 2, and therefore a lower load point can be maintained in accordance with the rotational speed/torque characteristic of the retarder 12. The oil supply 13 of the retarder has to be correspondingly designed with regard to the emergency operation.

Furthermore, rotational speed sensors 20, 21, 22 may be provided at the drives 2, 3.1, 3.2. Said rotational speed sensors may, for example, be formed by the pulse generators of the motors. Alternatively or in addition, a rotational speed sensor may be provided at the toothed gear of the transmission stage 6.1*a/b*, 6.2*a/b*, a rotational speed sensor may be provided at the toothed gear of the planet carrier 10, or a rotational speed sensor may be provided at the output shaft 15. Variants are thus specified with which all of the rotational speeds of the drives and that of the planet carrier can be measured. It is, however, ultimately sufficient if two of these rotational speeds are measured, because the other rotational speeds can then be determined by means of the rotational speed equation of the planetary transmission 18 and by means of the transmission ratios. Therefore, not all of the rotational speed sensors mentioned are required simultaneously.

The determination of the rotational speeds and in particular the knowledge of the profiles thereof in the event of a fault afford the advantage that it can thus be determined how the braking characteristics and braking profile have to be configured. These can be influenced by means of the controller of the filling of the retarder 12.

Figure 2:
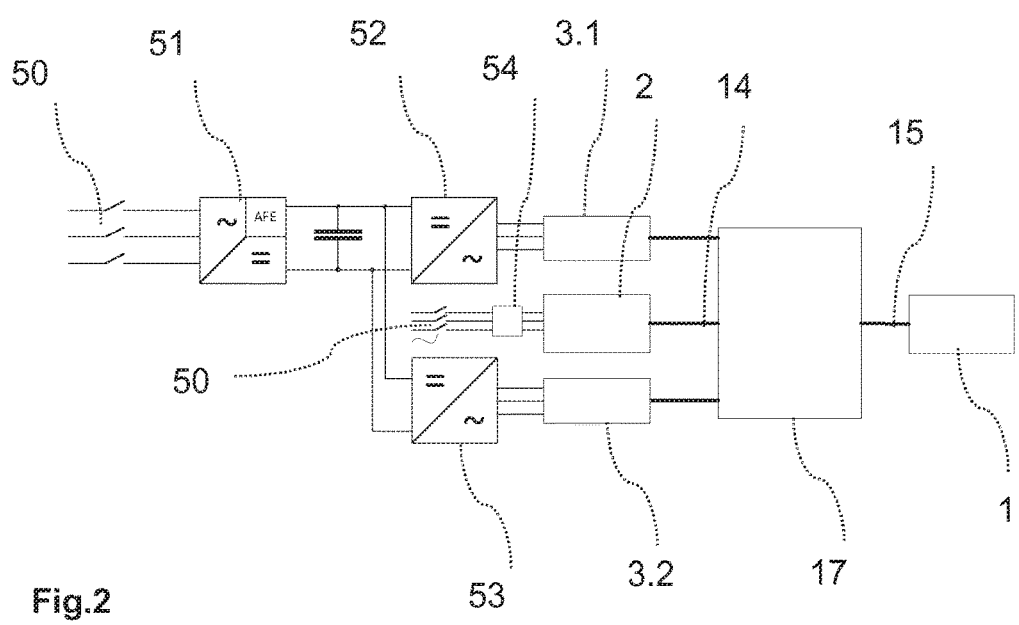
FIG. 2 shows a drive device according to the invention with connection to the power supply network

FIG. 2 illustrates an overall system with the drive device according to the invention, with the work machine 1 and with the connection to the energy supply network 50. The drive device comprises a superposition transmission 17 with an input shaft 14 and an output shaft 15, a main drive 2 and two auxiliary drives 3.1, 3.2. The main drive 2 is connected to the energy supply network 50 by means of a switching device 54 and is operated at a constant rotational speed. The auxiliary drives 3.1, 3.2 are connected to the network 50 via an inverter 52, 53 and a corresponding energy supply unit 51. The auxiliary drives can be operated variably in terms of rotational speed via the inverters 52, 53.

Figure 3:
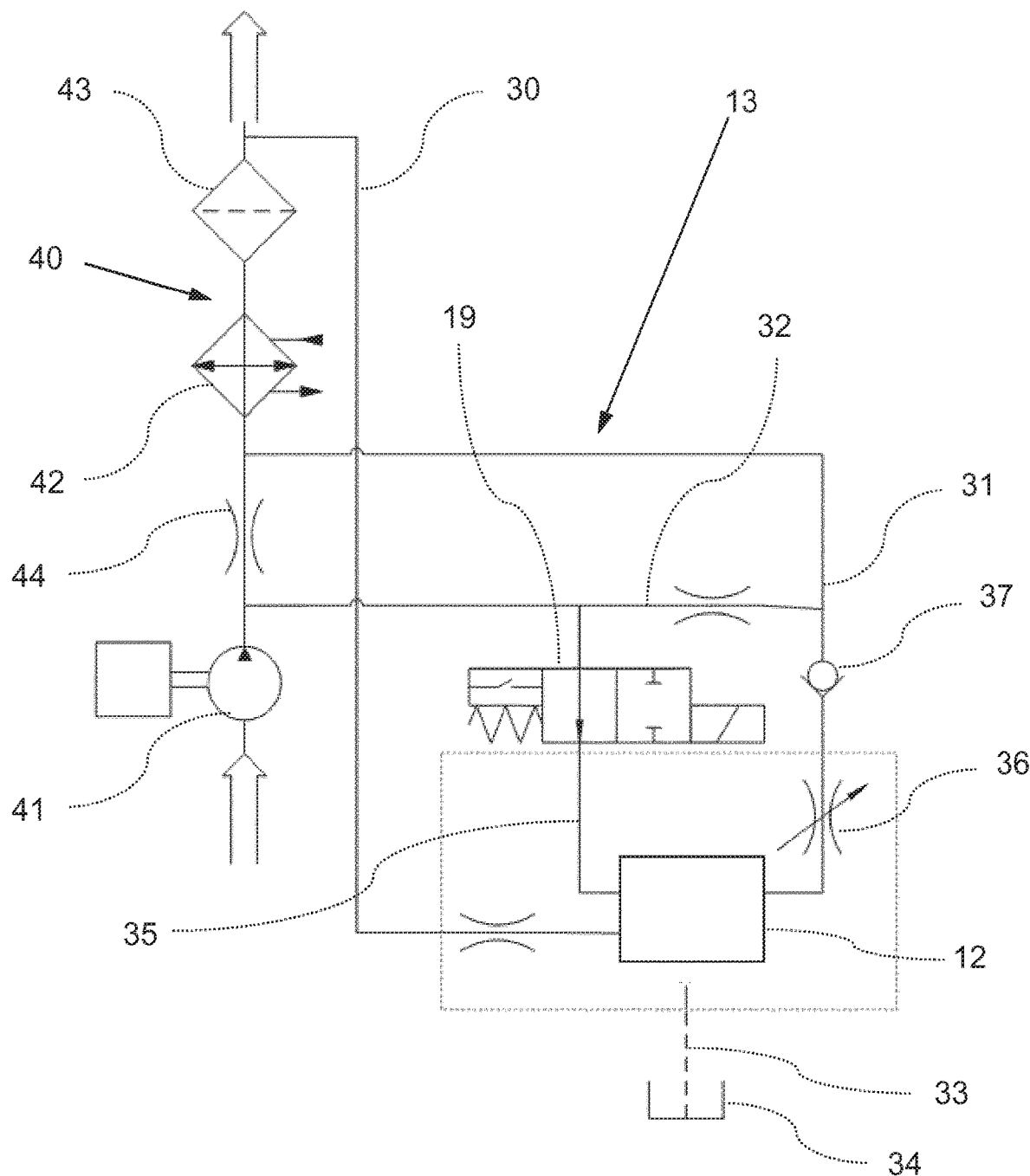
FIG. 3 shows details for the connection according to the invention of the retarder to a lubricating oil system for the drive device

FIG. 3 schematically illustrates, in the form of a detail, the oil supply 13 for the retarder 12 of a drive device according to the invention and the connection to the lubricating oil system 40. The connection to the lubricating oil system 40 can be arranged upstream or downstream of a lubricating oil heat exchanger 42 or of a lubricating oil filter 43. The feed line 35 leads via the valve 19 to the retarder 12, and the return line 31 leads from the retarder 12 again into the lubricating oil system 40.

In the event of a fault, the retarder 12 is activated by means of opening of the valve 19. The retarder 12 is filled with oil via the line 35 as soon as valve 19 releases the passage. For example, the valve 19 can be designed as a 0/1 valve or as a 2/2 way valve, as shown here. The temperature development in the retarder and the braking duration can be influenced by means of the adjustable throttle 36 located in the return line 31.

The valve 19 can be activated electrically, pneumatically or hydraulically, in particular by a relay or a memory-programmable controller. The valve 19 is preferably designed in such a manner that the inoperative position without energy supply is the position for releasing the passage. This can be achieved, for example, by means of a restoring spring. It is thus always ensured that the retarder 12 is filled in the event of a fault. The feed line 35 is blocked in the other switching position of the valve 19.

The pressure and volumetric flow for filling the retarder 12 are built up exclusively by means of the lubricating oil pump 41 in the lubricating oil circuit. In order to be able to control the filling, an adjustable throttle 36 and a nonreturn valve 37 can be provided in the return line 31. The lubricating oil pump 41 can be driven electrically by means of a motor, preferably with an interruption-free power supply. Or the lubricating oil pump 41 is mechanically connected to a shaft of the drive device, preferably of the planetary transmission 17, specifically in such a manner that the pump is driven as long as the planetary transmission 18 is still rotating, i.e. even when the main drive machine 2 is stationary.

In order to assist the filling of the retarder 12 and to build up a sufficient pressure gradient between feed 35 and return 31 until the retarder 12 acts in a self-priming manner, it is helpful to provide a throttle 44 in the line segment of the lubricating oil system 40 between the branching-off points of the feed and return.

In the event that the retarder 12 is also intended to be used during normal operation as a wear-free brake, it is of advantage if both the feed line 35 and return line 31 are arranged upstream of the heat exchanger 42 in the flow direction. As a result, the oil recycled from the retarder 12 can be cooled.

In addition, in the variant illustrated, a branching-off lubricating oil line 30 to the retarder is provided, said lubricating oil line also being able to have a throttle. The branching off of the lubricating oil line 30 is preferably arranged downstream of the oil filter 43. The lubrication of the retarder 12 is ensured independently of the operation of the retarder by means of the line routing illustrated. Additionally or alternatively, if no lubrication is required, for example because of an external mounting, the lubricating oil line 30 can serve to always guide some oil through the retarder 12 during normal operation, i.e. without braking. Heat which arises due to the idling losses is thus reliably dissipated. The idling loss is reduced by means of said small oil quantity.

Furthermore, an optional intermediate line 32 is illustrated which ensures that, even when the retarder 12 is inactive, i.e. when the valve 19 is closed, a certain amount of oil flows through part of the feed line 35 and part of the return line 31. This is advantageous especially when the line length between the lubricating oil system 40 and the retarder 12 is very long because a certain degree of frost protection and venting function are thereby achieved. The intermediate line 32 can contain a throttle by means of which the throughflow quantity is reduced, or by means of which a sufficient inflow quantity into the retarder 12 is ensured when the valve 19 is open.

In addition, the retarder 12 can be emptied by means of the emptying line 33, even if no oil can or is intended to be recycled into the lubricating oil circuit. The oil is conducted away into the oil sump 34.

LIST OF REFERENCE SIGNS 1 work machine
2 main drive machine
3.1, 3.2 auxiliary drive
4 ring gear
4.1 pinion
5 planet gears
6.1a, 6.1b,
6.2a, 6.2b spur gears of a transmission stage
7 sun gear
8.1, 8.2 spur gears of a further transmission stage
9 transmission housing
10 planet carrier
12 retarder
13 oil supply for retarder
14 input shaft
15 output shaft
16.1, 16.2 auxiliary drive shafts
17 superposition transmission
18 planetary transmission
19 valve for filling the retarder
20, 21, 22 rotational speed sensors
30 lubricating oil line to the retarder
31 return line
32 intermediate line
33 drain line
34 oil sump
35 feed line
36 return throttle
37 nonreturn valve
40 lubricating oil system
41 lubricating oil pump
42 lubricating oil heat exchanger
43 lubricating oil filter
50 network
51 energy supply of inverter
52, 53 inverter for auxiliary drives
54 switching device for main drive machine

The invention claimed is:

1. A drive device, comprising:
a superposition transmission having a planetary transmission with a ring gear, a sun gear, a planet carrier, and a plurality of planet gears;
said superposition transmission including an input shaft connected between said ring gear and a main drive machine, and an output shaft connected to said sun gear and to be connected to a work machine;
at least one auxiliary drive;
a hydrodynamic retarder for braking said auxiliary drive and said output shaft of said superposition transmission, said retarder being connected to said auxiliary drive;
at least one transmission stage with a constant transmission ratio connecting said at least one auxiliary drive to said planet carrier;
a lubricating oil system for the drive device incorporating said retarder in parallel, with a feed line branching off from said lubricating oil system and leading to said retarder, and with a return line leading from said retarder and opening into said lubricating oil system; and
a valve disposed in said feed line and configured to open said feed line in an event of a fast shutdown or a failure of an energy supply to one of said main drive or said auxiliary drive and to therefore cause said retarder to be filled with oil.

2. The device according to claim 1, wherein said valve has two switching positions, including a first position, in which said feed line to said retarder is blocked, and a second switching position, in which said feed line to said retarder is released, and wherein said valve is configured to assume the first switching position during normal operation and to pass into the second switching position in the event of failure or interruption of an energy supply of said valve.

3. The device according to claim 1, wherein said valve is a 2-2 way valve and includes a restoring spring.

4. The device according to claim 1, further comprising at least one adjustable throttle and/or at least one nonreturn valve provided in said return line.

5. The device according to claim 1, wherein said superposition transmission has a transmission housing, and said retarder is arranged outside said transmission housing.

6. The device according to claim 1, wherein said retarder is connected to said auxiliary drive to have the same rotational speed as said auxiliary drive.

7. The device according to claim 1, further comprising an intermediate line connecting said feed line upstream of said valve to said return line in such a manner that, during an operation of the drive device, some oil may flow permanently through said intermediate line even if said retarder is not activated.

8. The device according to claim 7, further comprising a throttle disposed in said intermediate line connected between said feed line and said return line.

9. The device according to claim 1, wherein said retarder is equipped with a drain line for discharging oil from said retarder into an oil sump.

10. The device according to claim 1, further comprising a lubricating oil line connected to said retarder for enabling an amount of oil to permanently flow out of said lubricating oil system through said retarder during an operation of the drive device.

11. The device according to claim 1, further comprising a throttle disposed in a line segment of said lubricating oil system between a branching off of said feed line from said lubricating oil system and an opening of said return line into said lubricating oil system.

12. The device according to claim 1, further comprising a lubricating oil pump disposed in said lubricating oil system, said lubricating oil pump being mechanically coupled to a shaft of the drive device such that, even in the event of a failure or interruption of the energy supply for the drive device, said lubricating oil pump continues to be driven as long as the shaft rotates, and to thereby fill the oil supply of said retarder.

13. The device according to claim 12, wherein the shaft of the drive device is a shaft of said planetary transmission.

14. The device according to claim 1, further comprising a lubricating oil pump in said lubricating oil system, said lubricating oil pump being connected to a motor with an interruption-free power supply, and wherein, even in the event of a failure or interruption of the energy supply for the drive device, said lubricating oil pump continues to be driven, and to thereby fill the oil supply of said retarder.

* * * * *